United States Patent
Chen et al.

(10) Patent No.: US 12,007,778 B2
(45) Date of Patent: Jun. 11, 2024

(54) NEURAL NETWORK BASED VEHICLE DYNAMICS MODEL

(71) Applicant: TuSimple, Inc., San Diego, CA (US)

(72) Inventors: Jun Chen, San Diego, CA (US); Wutu Lin, San Diego, CA (US); Liu Liu, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

(21) Appl. No.: 18/094,363

(22) Filed: Jan. 8, 2023

(65) Prior Publication Data

US 2023/0161354 A1    May 25, 2023

Related U.S. Application Data

(63) Continuation of application No. 17/147,836, filed on Jan. 13, 2021, now Pat. No. 11,550,329, which is a
(Continued)

(51) Int. Cl.
| | |
|---|---|
| G06F 30/20 | (2020.01) |
| G05D 1/00 | (2006.01) |
| G06N 3/00 | (2023.01) |

(52) U.S. Cl.
CPC ......... *G05D 1/0221* (2013.01); *G05D 1/0088* (2013.01); *G05D 1/0274* (2013.01); *G05D 1/0285* (2013.01); *G06N 3/00* (2013.01)

(58) Field of Classification Search
CPC ...... G06N 3/00; G05D 1/0221; G05D 1/0888; G05D 1/0274; G05D 1/0285
(Continued)

(56) References Cited

U.S. PATENT DOCUMENTS

| | | | | |
|---|---|---|---|---|
| 5,913,576 A | * | 6/1999 | Naito ................. | B60T 8/17616 |
| | | | | 303/183 |
| 6,777,904 B1 | * | 8/2004 | Degner ................. | G05D 17/02 |
| | | | | 318/609 |

(Continued)

FOREIGN PATENT DOCUMENTS

| | | |
|---|---|---|
| EP | 1754179 A1 | 2/2007 |
| EP | 2448251 A2 | 5/2012 |

(Continued)

OTHER PUBLICATIONS

Hou, Xiaodi and Zhang, Liqing, "Saliency Detection: A Spectral Residual Approach", Computer Vision and Pattern Recognition, CVPR'07—IEEE Conference, pp. 1-8, 2007.
(Continued)

*Primary Examiner* — Andre Pierre Louis
(74) *Attorney, Agent, or Firm* — Inventive Law Inc.; Jim H. Salter

(57) ABSTRACT

A system and method for implementing a neural network based vehicle dynamics model are disclosed. A particular embodiment includes: training a machine learning system with a training dataset corresponding to a desired autonomous vehicle simulation environment; receiving vehicle control command data and vehicle status data, the vehicle control command data not including vehicle component types or characteristics of a specific vehicle; by use of the trained machine learning system, the vehicle control command data, and vehicle status data, generating simulated vehicle dynamics data including predicted vehicle acceleration data; providing the simulated vehicle dynamics data to an autonomous vehicle simulation system implementing the autonomous vehicle simulation environment; and using data produced by the autonomous vehicle simulation system to modify the vehicle status data for a subsequent iteration.

20 Claims, 6 Drawing Sheets

Related U.S. Application Data continuation of application No. 15/672,207, filed on Aug. 8, 2017, now Pat. No. 11,029,693.

(58) Field of Classification Search
USPC .......................................... 703/6, 8; 701/27
See application file for complete search history.

(56) References Cited

U.S. PATENT DOCUMENTS

| | | |
|---|---|---|
| 7,689,559 B2 | 3/2010 | Canright |
| 7,844,595 B2 | 11/2010 | Canright |
| 8,041,111 B1 | 10/2011 | Wilensky |
| 8,064,643 B2 | 11/2011 | Stein |
| 8,082,101 B2 | 12/2011 | Stein |
| 8,164,628 B2 | 4/2012 | Stein |
| 8,175,376 B2 | 5/2012 | Marchesotti |
| 8,271,871 B2 | 9/2012 | Marchesotti |
| 8,378,851 B2 | 2/2013 | Stein |
| 8,401,292 B2 | 3/2013 | Park |
| 8,478,072 B2 | 7/2013 | Aisaka |
| 8,553,088 B2 | 10/2013 | Stein |
| 8,908,041 B2 | 12/2014 | Stein |
| 8,917,169 B2 | 12/2014 | Schofield |
| 8,963,913 B2 | 2/2015 | Baek |
| 8,981,966 B2 | 3/2015 | Stein |
| 8,993,951 B2 | 3/2015 | Schofield |
| 9,008,369 B2 | 4/2015 | Schofield |
| 9,025,880 B2 | 5/2015 | Perazzi |
| 9,042,648 B2 | 5/2015 | Wang |
| 9,117,133 B2 | 8/2015 | Barnes |
| 9,118,816 B2 | 8/2015 | Stein |
| 9,120,485 B1 | 9/2015 | Dolgov |
| 9,122,954 B2 | 9/2015 | Srebnik |
| 9,145,116 B2 | 9/2015 | Clarke |
| 9,147,255 B1 | 9/2015 | Zhang |
| 9,156,473 B2 | 10/2015 | Clarke |
| 9,176,006 B2 | 11/2015 | Stein |
| 9,179,072 B2 | 11/2015 | Stein |
| 9,183,447 B1 | 11/2015 | Gdalyahu |
| 9,185,360 B2 | 11/2015 | Stein |
| 9,191,634 B2 | 11/2015 | Schofield |
| 9,233,659 B2 | 1/2016 | Rosenbaum |
| 9,233,688 B2 | 1/2016 | Clarke |
| 9,248,832 B2 | 2/2016 | Huberman |
| 9,251,708 B2 | 2/2016 | Rosenbaum |
| 9,277,132 B2 | 3/2016 | Berberian |
| 9,280,155 B2 * | 3/2016 | Cox ...................... G05D 13/62 |
| 9,280,711 B2 | 3/2016 | Stein |
| 9,286,522 B2 | 3/2016 | Stein |
| 9,297,641 B2 | 3/2016 | Stein |
| 9,299,004 B2 | 3/2016 | Lin |
| 9,317,776 B1 | 4/2016 | Honda |
| 9,330,334 B2 | 5/2016 | Lin |
| 9,355,635 B2 | 5/2016 | Gao |
| 9,365,214 B2 | 6/2016 | Ben Shalom |
| 9,428,192 B2 | 8/2016 | Schofield |
| 9,436,880 B2 | 9/2016 | Bos |
| 9,443,163 B2 | 9/2016 | Springer |
| 9,446,765 B2 | 9/2016 | Ben Shalom |
| 9,459,515 B2 | 10/2016 | Stein |
| 9,466,006 B2 | 10/2016 | Duan |
| 9,490,064 B2 | 11/2016 | Hirosawa |
| 9,531,966 B2 | 12/2016 | Stein |
| 9,555,803 B2 | 1/2017 | Pawlicki |
| 10,268,200 B2 | 4/2019 | Fang |
| 2007/0230792 A1 | 10/2007 | Shashua |
| 2010/0226564 A1 | 9/2010 | Marchesotti |
| 2010/0281361 A1 | 11/2010 | Marchesotti |
| 2011/0206282 A1 | 8/2011 | Aisaka |
| 2012/0105639 A1 | 5/2012 | Stein |
| 2012/0140076 A1 | 6/2012 | Rosenbaum |
| 2012/0274629 A1 | 11/2012 | Baek |
| 2014/0145516 A1 | 5/2014 | Hirosawa |
| 2014/0198184 A1 | 7/2014 | Stein |
| 2015/0062304 A1 | 3/2015 | Stein |
| 2016/0037064 A1 | 2/2016 | Stein |
| 2016/0094774 A1 | 3/2016 | Li |
| 2016/0165157 A1 | 6/2016 | Stein |
| 2016/0210528 A1 | 7/2016 | Duan |
| 2017/0132334 A1 * | 5/2017 | Levinson ............... G01S 17/931 |
| 2018/0164810 A1 * | 6/2018 | Luo ...................... G05D 1/0223 |
| 2019/0228571 A1 * | 7/2019 | Atsmon ............. G01C 21/3815 |

FOREIGN PATENT DOCUMENTS

| | | |
|---|---|---|
| EP | 2463843 A2 | 6/2012 |
| EP | 2463843 A3 | 7/2013 |
| EP | 2761249 A1 | 8/2014 |
| EP | 2463843 B1 | 7/2015 |
| EP | 2448251 A3 | 10/2015 |
| EP | 2946336 A2 | 11/2015 |
| EP | 2993654 A1 | 3/2016 |
| EP | 3081419 A1 | 10/2016 |
| WO | WO/2005/098739 A1 | 10/2005 |
| WO | WO/2005/098751 A1 | 10/2005 |
| WO | WO/2005/098782 | 10/2005 |
| WO | WO/2010/109419 A1 | 9/2010 |
| WO | WO/2013/045612 | 4/2013 |
| WO | WO/2014/111814 A2 | 7/2014 |
| WO | WO/2014/111814 A3 | 7/2014 |
| WO | WO/2014/201324 | 12/2014 |
| WO | WO/2015/083009 | 6/2015 |
| WO | WO/2015/103159 A1 | 7/2015 |
| WO | WO/2015/125022 | 8/2015 |
| WO | WO/2015/186002 A2 | 12/2015 |
| WO | WO/2015/186002 A3 | 12/2015 |
| WO | WO/2016/135736 | 9/2016 |
| WO | WO/2017/013875 A1 | 1/2017 |

OTHER PUBLICATIONS

Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.

Hou, Xiaodi and Zhang, Liqing, "Dynamic Visual Attention: Searching for Coding Length Increments", Advances in Neural Information Processing Systems, vol. 21, pp. 681-688, 2008.

Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.

Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.

Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.

Hou, Xiaodi and Zhang, Liqing, "Color Conceptualization", Proceedings of the 15th ACM International Conference on Multimedia, pp. 265-268, ACM, 2007.

Hou, Xiaodi and Zhang, Liqing, "Thumbnail Generation Based on Global Saliency", Advances in Cognitive Neurodynamics, ICCN 2007, pp. 999-1003, Springer Netherlands, 2008.

Hou, Xiaodi and Yuille, Alan and Koch, Christof, "A Meta-Theory of Boundary Detection Benchmarks", arXiv preprint arXiv:1302.5985, pp. 1-4, Feb. 25, 2013.

Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, pp. 1-12, Nov. 8, 2016.

Li, Yanghao and Wang, Naiyan and Liu, Jiaying and Hou, Xiaodi, "Demystifying Neural Style Transfer", arXiv preprint arXiv:1701.01036, pp. 1-8, Jan. 4, 2017.

Hou, Xiaodi and Zhang, Liqing, "A Time-Dependent Model of Information Capacity of Visual Attention", International Conference on Neural Information Processing, pp. 127-136, Springer Berlin Heidelberg, 2006.

(56) References Cited

OTHER PUBLICATIONS

Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, pp. 1-10, Feb. 27, 2017.
Li, Yanghao and Wang, Naiyan and Liu, Jiaying and Hou, Xiaodi, "Factorized Bilinear Models for Image Recognition", arXiv preprint arXiv:1611.05709, pp. 1-9, Mov. 17, 2016.
Hou, Xiaodi, "Computational Modeling and Psychophysics in Low and Mid-Level Vision", California Institute of Technology, pp. i to xi and 1-114, May 7, 2014.
Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010; Issue published: Oct. 1, 2010.
Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, pp. 13-23, Jan. 1, 2001.
Kyoungho Ahn, Hesham Rakha, "The Effects of Route Choice Decisions on Vehicle Energy Consumption and Emissions", Virginia Tech Transportation Institute, Blacksburg, VA 24061, pp. 1-32, May 1, 2008.
Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV], pp. 1-8, Dec. 20, 2016.
Schroff, Florian, Dmitry Kalenichenko, James Philbin, (Google), "FaceNet: A Unified Embedding for Face Recognition and Clustering", pp. 1-10, CVPR Jun. 17, 2015.
Dai, Jifeng, Kaiming He, Jian Sun, (Microsoft Research), "Instance-aware Semantic Segmentation via Multi-task Network Cascades", pp. 1-10, CVPR Dec. 14, 2015.
Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO], pp. 1-7, Apr. 17, 2015.
Tian Li, "Proposal Free Instance Segmentation Based on Instance-aware Metric", Department of Computer Science, Cranberry-Lemon University, Pittsburgh, PA., pp. 1-2, 2015.
Mohammad Norouzi, David J. Fleet, Ruslan Salakhutdinov, "Hamming Distance Metric Learning", Departments of Computer Science and Statistics, University of Toronto, pp. 1-9, 2012.
Jain, Suyong Dutt, Grauman, Kristen, "Active Image Segmentation Propagation", In Proceedings of the IEEE Conference on Computer Vision and Pattern Recognition (CVPR), pp. 1-10, Las Vegas, Jun. 2016.
MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), pp. 1-8, 2014.
Kendall, Alex, Gal, Yarin, "What Uncertainties Do We Need in Bayesian Deep Learning for Computer Vision", arXiv:1703.04977v1 [cs.CV], pp. 1-11, Mar. 15, 2017.
Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, pp. 512-517, Jun. 21-24, 2010.
Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, pp. 1-9, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV], pp. 1-7, Nov. 29, 2016.
P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, pp. 1-16, 2016.
Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, pp. 298-312, Mar. 2007.
Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, pp. 1-11, 2016.
Adhiraj Somani, Nan Ye, David Hsu, and Wee Sun Lee, "DESPOT: Online POMDP Planning with Regularization", Department of Computer Science, National University of Singapore, pp. 1-9, 2013.
Adam Paszke, Abhishek Chaurasia, Sangpil Kim, and Eugenio Culurciello. Enet: A deep neural network architecture for real-time semantic segmentation. CoRR, abs/1606.02147, pp. 1-10, 2016.
Chinese Office Action for CN application No. 201711329345.1, filed Dec. 13, 2017, publ. No. 20210330002782080, dated Apr. 2, 2021, document includes English abstract serving as a concise explanation.

\* cited by examiner

NEURAL NETWORK BASED VEHICLE DYNAMICS MODEL

PRIORITY/RELATED DOCUMENTS

This patent application is a continuation of U.S. patent application Ser. No. 17/147,836, titled "NEURAL NETWORK BASED VEHICLE DYNAMICS MODEL," filed on Jan. 13, 2021, which is a continuation of U.S. patent application Ser. No. 15/672,207, titled "NEURAL NETWORK BASED VEHICLE DYNAMICS MODEL," filed on Aug. 8, 2017, now U.S. Pat. No. 11,029,693. This non-provisional patent application draws priority from the referenced patent applications. The entire disclosure of the referenced patent applications is considered part of the disclosure of the present application and is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2016-2022, TuSimple, Inc., All Rights Reserved.

TECHNICAL FIELD

This patent document pertains generally to tools (systems, apparatuses, methodologies, computer program products, etc.) for autonomous driving simulation systems, vehicle control systems, and autonomous driving systems, and more particularly, but not by way of limitation, to a system and method for implementing a neural network based vehicle dynamics model.

BACKGROUND

Autonomous vehicle simulation is an important process for developing and configuring autonomous vehicle control systems. These vehicle simulation systems need to produce vehicle movements and dynamics that mirror the movement and dynamics of vehicles in the real world. However, there are thousands of different types of vehicles operating in the real world, each having different types of components and/or different vehicle characteristics. Conventional simulation systems need detailed information about the engine and transmission or vehicle component types or characteristics of each specific vehicle being simulated. This detailed information for a large number of vehicle types is very difficult to collect, maintain, and use. As such, the conventional vehicle simulation systems are unwieldy, inefficient, and not readily adaptable to new vehicle types.

SUMMARY

A system and method for implementing a neural network based vehicle dynamics model are disclosed herein. The vehicle dynamics model is one of the key subsystems for producing accurate vehicle simulation results in an autonomous vehicle simulation system. In various example embodiments as disclosed herein, the data-driven modeling system and method based on a neural network allows the modeling system to predict accurate vehicle accelerations and torque based on recorded historical vehicle driving data. To generate the predicted vehicle accelerations, a control command (e.g., throttle, brake, and steering commands) and vehicle status (e.g., vehicle pitch and speed status) are provided as inputs to the modeling system for each time step. To generate the predicted vehicle torque, a control command (e.g., throttle and brake commands) and vehicle status (e.g., vehicle speed status) are provided as inputs to the modeling system for each time step. The modeling system as described herein can use these inputs to generate the predicted vehicle acceleration and torque.

In contrast to other vehicle dynamics models, the system and method disclosed herein does not need the detailed information about the engine and transmission or vehicle component types or characteristics of a specific vehicle. This feature of the disclosed embodiments is very useful for the vehicle simulation in the simulation system; because, the dynamics and status of a specific engine and transmission or other vehicle component types or characteristics are often difficult to obtain and to model. Moreover, the modeling system of the various example embodiments as disclosed herein can be easily adapted to work with any type of vehicle by simply changing the training data used to configure the neural network. This beneficial attribute of the modeling system as disclosed herein saves model rebuilding time when working with other types of vehicles.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

A system and method for implementing a neural network based vehicle dynamics model are disclosed herein. The vehicle dynamics model is one of the key subsystems for producing accurate vehicle simulation results in a simulation system. In various example embodiments as disclosed herein, the data-driven modeling system and method based on a neural network allows the modeling system to predict accurate vehicle accelerations based on recorded historical vehicle driving data. To generate the predicted vehicle accelerations, a control command (e.g., throttle, brake, and steering commands) and vehicle status (e.g., vehicle pitch and speed status) are provided as inputs to the modeling system for each time step. The modeling system as described herein can use these inputs to generate the predicted vehicle acceleration. In an alternative embodiment disclosed herein, the data-driven modeling system and method based on a neural network allows the modeling system to predict accurate vehicle torque based on recorded historical vehicle driving data. To generate the predicted vehicle torque, a control command (e.g., throttle and brake commands) and vehicle status (e.g., vehicle speed status) are provided as inputs to the modeling system for each time step. The modeling system of the alternative embodiment as described herein can use these inputs to generate the predicted vehicle torque.

In contrast to other vehicle dynamics models, the system and method disclosed herein does not need the detailed information about the engine and transmission or other vehicle component types or characteristics of a specific vehicle. This feature of the disclosed embodiments is very useful for the vehicle simulation in the simulation system; because, the dynamics and status of a specific engine and transmission or other vehicle component types or characteristics are often difficult to obtain and to model. Moreover, the modeling system of the various example embodiments as disclosed herein can be easily adapted to work with any type of vehicle by simply changing the training data used to configure the neural network. This beneficial attribute of the modeling system as disclosed herein saves model rebuilding time when working with other type of vehicles.

Figure 1:
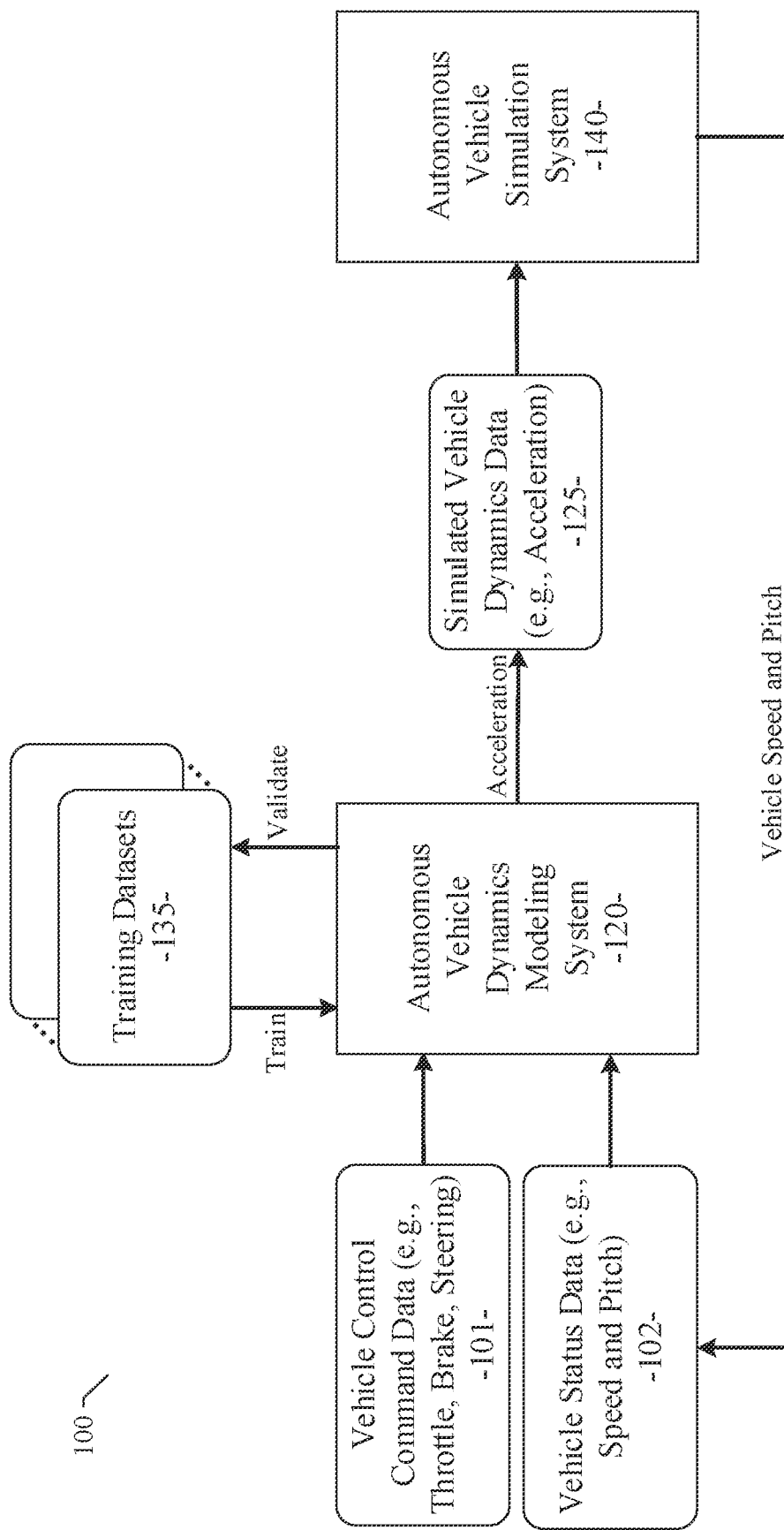
FIG. 1 illustrates a system view of an autonomous vehicle dynamics modeling and simulation system according to an example embodiment.

As described in various example embodiments, a system and method for implementing a neural network based vehicle dynamics model are described herein. Referring to FIG. 1, a system view of an autonomous vehicle dynamics modeling and simulation system according to an example embodiment is illustrated. As shown, the system 100 includes an autonomous vehicle dynamics modeling system 120 and an autonomous vehicle simulation system 140. The autonomous vehicle dynamics modeling system 120, as described in more detail below, can be configured to receive vehicle control command data 101 and vehicle status data 102, which could be provided to a vehicle simulation system. In the various example embodiments disclosed herein, the vehicle control command data 101 does not include vehicle component types or characteristics of a specific vehicle, as would be typically required in a conventional system. By use of the components and techniques described in more detail below, the autonomous vehicle dynamics modeling system 120 can generate simulated vehicle dynamics data 125 including predicted vehicle acceleration data, based in part on the vehicle control command data 101 and vehicle status data 102. The simulated vehicle dynamics data 125 can be provided to an autonomous vehicle simulation system 140 implementing an autonomous vehicle simulation environment. The autonomous vehicle simulation system 140 can produce updated vehicle speed and pitch data, which can be used to modify the vehicle status data 102 for a subsequent iteration of the process enabled by system 100. As a result, the predicted vehicle acceleration data generated by the autonomous vehicle dynamics modeling system 120 can provide the autonomous vehicle simulation system 140 with accurate simulated vehicle dynamics data 125, which improves the accuracy and efficiency of the vehicle simulation produced by the autonomous vehicle simulation system 140.

As also shown in FIG. 1, a training dataset 135 can also be provided as an input to the autonomous vehicle dynamics modeling system 120 and used to train a neural network or other machine learning system within the autonomous vehicle dynamics modeling system 120. As well-known to those of ordinary skill in the art, artificial neural networks (ANNs) or connectionist systems are computing systems inspired by the biological neural networks that constitute animal brains. Such systems learn (progressively improve performance) to do tasks by considering previously or historically gathered examples, generally without task-specific programming. The considered examples are represented in training data used to configure the operation of a particular neural network or other machine learning system. Many such machine learning systems are focused on the application of neural networks to artificial intelligence. Machine learning focuses on prediction, based on known properties learned from the training data. Given different training datasets, a particular neural network will produce different results. The general use of neural networks or other machine learning systems is known to those of ordinary skill in the art.

In the various example embodiments described herein, a neural network or other machine learning system is used to predict accurate vehicle accelerations based on recorded or otherwise captured historical vehicle driving data. In an example embodiment, vehicle driving data corresponding to real world vehicle operations or simulated vehicle movements is captured over time for a large number of vehicles in a large number of operating environments. The vehicle driving data can be annotated or labeled to enhance the utility of the data in a machine learning training dataset. As this vehicle driving data is captured over a long time period and a wide operating environment, patterns of vehicle dynamics begin to emerge. For example, similar types of vehicles operating in a similar environment tend to operate or move in a similar manner. As such, these patterns of movement, as represented in the training dataset, can be used to predict the dynamics of a vehicle for which the specific vehicle movement is unknown. As shown in FIG. 1, this historical vehicle driving data for a plurality of particular vehicle simulation environments can be represented as various sets of data in training datasets 135. Each of the training datasets 135 can represent a particular vehicle simulation environment with particular types of vehicles having a defined set of characteristics. A selected one of the plurality of training datasets 135 can be used to train the machine learning system within the autonomous vehicle dynamics modeling system 120 to produce a particular and desired autonomous vehicle simulation environment. As described in more detail below, the autonomous vehicle dynamics modeling system 120 can generate simulated vehicle dynamics data 125 including predicted vehicle acceleration data, based on the machine learning system trained with a desired training dataset 135 and based on the vehicle control command data 101 and vehicle status data 102. The resulting simulated vehicle dynamics data 125 provides the autonomous vehicle simulation system 140 with vehicle dynamics data configured for a particular vehicle simulation environment, including particular types of vehicles having a defined set of characteristics. This enables the autonomous vehicle simulation system 140 to adapt to a particular and desired autonomous vehicle simulation environment.

Figure 2:
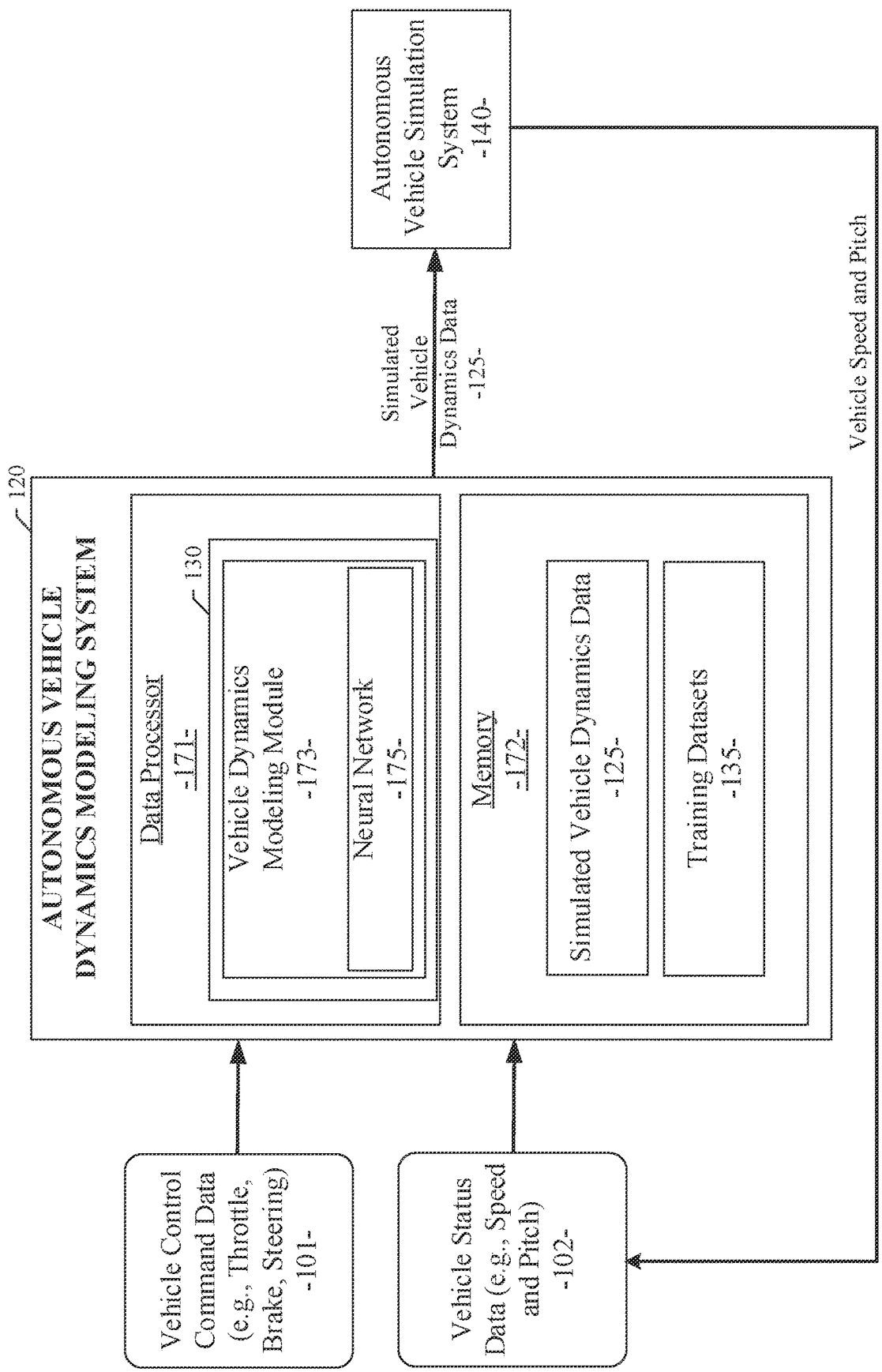
FIG. 2 illustrates a component view of the autonomous vehicle dynamics modeling and simulation system according to an example embodiment.

Referring now to FIG. 2, a component view of the autonomous vehicle dynamics modeling and simulation system according to an example embodiment is illustrated. FIG. 2 illustrates the components of the autonomous vehicle dynamics modeling system 120 of an example embodiment. In the example embodiment, the autonomous vehicle dynamics modeling system 120 can be configured to include an autonomous vehicle dynamics modeling module 130 configured for execution by a data processor 171 in a computing environment of the autonomous vehicle dynamics modeling system 120. In the example embodiment, the autonomous vehicle dynamics modeling module 130 can be configured to include a vehicle dynamics modeling module 173 and a neural network 175. The vehicle dynamics modeling module 173 and the neural network 175 can be configured as software modules for execution by the data processor 171. As described in more detail herein, the vehicle dynamics modeling module 173 and the neural network 175 serve to model vehicle dynamics for different types autonomous vehicle simulation environments.

As shown in FIG. 2, a data storage device or memory 172 can also be provided in the autonomous vehicle dynamics modeling system 120 of an example embodiment. The memory 172 can be implemented with standard data storage devices (e.g., flash memory, DRAM, SIM cards, or the like) or as cloud storage in a networked server. In an example embodiment, the memory 172 can be used to store sets of simulated vehicle dynamics data 125 and training datasets 135 for training the neural network 175. The simulated vehicle dynamics data 125 corresponds to a data representation of various sets of simulated vehicle dynamics data 125 generated by the autonomous vehicle dynamics modeling system 120. The memory 172 can also be used to store a plurality of training datasets 135. The training datasets 135 correspond to a data representation of various sets of training data used to train the neural network 175 for various desired autonomous vehicle simulation environments.

Referring still to FIG. 2, the autonomous vehicle dynamics modeling system 120, and the vehicle dynamics modeling module 173 therein, can produce simulated vehicle dynamics data 125 that corresponds to the modeled vehicle dynamics data produced for the input vehicle control command data 101 and the vehicle status data 102 and based on the neural network 175 trained using one or more of the training datasets 135. In the various example embodiments disclosed herein, the vehicle control command data 101 can include control data for a particular vehicle including throttle control data, brake control data, and steering control data. It will be apparent to those of ordinary skill in the art in view of the disclosure herein that other types of vehicle control data may be provided as input to the autonomous vehicle dynamics modeling system 120. However, in the various example embodiments disclosed herein, the vehicle control command data 101 does not include vehicle component types or characteristics of a specific vehicle, as would be typically required in a conventional system. As such, the vehicle control command data 101 can be independent of and excluding data corresponding to particular vehicle component types or characteristics of a specific vehicle. Thus, the various embodiments disclosed herein do not need vehicle-specific component or characteristic information. This feature of the disclosed embodiments is very useful for vehicle simulation in a simulation system; because, the dynamics and status of a specific engine and transmission or other vehicle component types or characteristics are often difficult to obtain and to model.

In the various example embodiments disclosed herein, the vehicle status data 102 can include speed data and pitch data for a particular vehicle. Pitch data corresponds to the vehicle's degree of inclination or slope. It will be apparent to those of ordinary skill in the art in view of the disclosure herein that other types of vehicle status data may be provided as input to the autonomous vehicle dynamics modeling system 120. In a typical operational scenario, the autonomous vehicle dynamics modeling system 120 periodically receives inputs 101 and 102 for a particular iteration and generates the corresponding simulated vehicle dynamics data 125 for the autonomous vehicle simulation system 140. Each iteration can be configured to occur at or within a particular pre-defined rate. When the autonomous vehicle simulation system 140 receives the simulated vehicle dynamics data 125 for a current iteration, the autonomous vehicle simulation system 140 can generate updated vehicle speed and pitch data corresponding to the received simulated vehicle dynamics data 125 for the current iteration. As shown in FIG. 2, this updated vehicle speed and pitch data for the current iteration can be fed back to the autonomous vehicle dynamics modeling system 120 and used to update the vehicle status data 102 provided as an input to the autonomous vehicle dynamics modeling system 120 for a subsequent iteration. As a result, the autonomous vehicle dynamics modeling system 120 can use the current vehicle status data 102 generated by the autonomous vehicle simulation system 140.

For each iteration, the autonomous vehicle dynamics modeling system 120, and the vehicle dynamics modeling module 173 therein, can produce simulated vehicle dynamics data 125 that corresponds to the modeled vehicle dynamics data produced for the input vehicle control command data 101 and the vehicle status data 102 and based on the neural network 175 trained using one or more of the training datasets 135. The simulated vehicle dynamics data 125 can include predicted vehicle acceleration data for the current iteration, based on the vehicle control command data 101, the vehicle status data 102, and the trained neural network 175. The predicted vehicle acceleration data can be used by the autonomous vehicle simulation system 140 to generate corresponding vehicle speed and pitch data, among other values generated for the particular autonomous vehicle simulation environment. As shown in FIG. 1, the predicted vehicle acceleration data and the corresponding vehicle speed and pitch data can be used to provide a validation output, which can be used to validate the accuracy of the training dataset 135 being used by the autonomous vehicle dynamics modeling system 120. This validation output can be used to continually improve the accuracy of each of the training datasets 135.

In various example embodiments as disclosed herein, the data-driven modeling system and method based on a neural network allows the autonomous vehicle dynamics modeling system 120 to predict accurate vehicle accelerations based on recorded historical vehicle driving data as embodied in the trained neural network 175. To generate the predicted vehicle accelerations, the vehicle control command data 101 (e.g., throttle, brake, and steering commands) and the vehicle status data (e.g., vehicle pitch and speed status) are provided as inputs to the autonomous vehicle dynamics modeling system 120 for each time step or iteration. Because the predicted vehicle accelerations are based in part on the trained neural network 175, the particular autonomous vehicle simulation environment can be readily changed and adapted to a new simulation environment by retraining the neural network 175 with a new training dataset 135. In this manner, the autonomous vehicle dynamics modeling system 120 is readily adaptable to desired simulation environments without having to provide detailed vehicle component type information or specific vehicle characteristic information to the autonomous vehicle dynamics modeling system 120. As such, the autonomous vehicle dynamics modeling system 120 of the various example embodiments as disclosed herein can be easily adapted to work with any type of vehicle by simply changing the training data 135 used to configure the neural network 175. This beneficial attribute of the modeling system as disclosed herein saves model rebuilding time when working with other types of vehicles.

Figure 3:
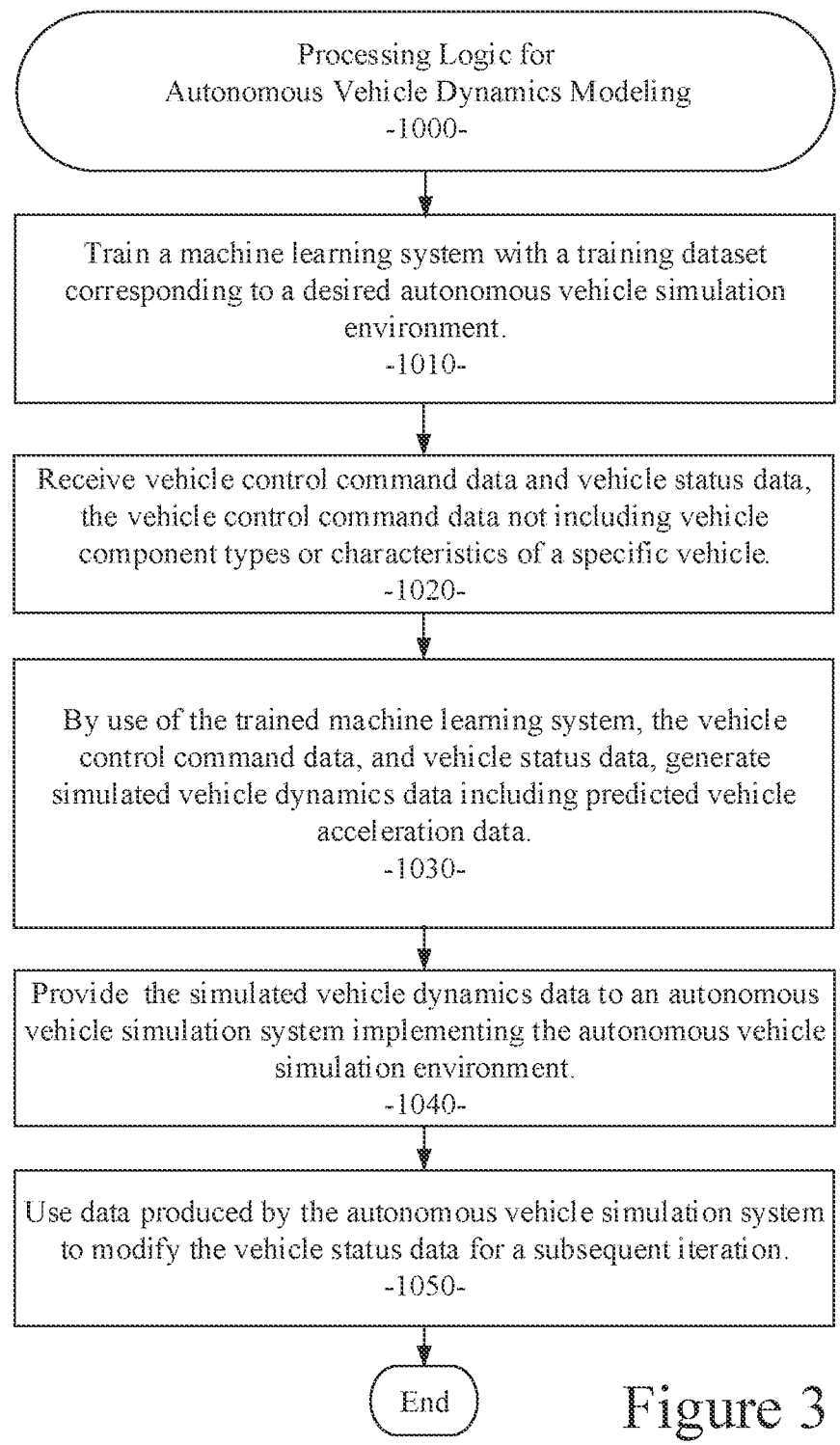
FIG. 3 is a process flow diagram illustrating an example embodiment of a system and method for implementing a neural network based vehicle dynamics model.

Referring now to FIG. 3, a flow diagram illustrates an example embodiment of a system and method 1000 for autonomous vehicle dynamics simulation. The example embodiment can be configured for: training a machine learning system with a training dataset corresponding to a desired autonomous vehicle simulation environment (processing block 1010); receiving vehicle control command data and vehicle status data, the vehicle control command data not including vehicle component types or characteristics of a specific vehicle (processing block 1020); by use of the trained machine learning system, the vehicle control command data, and vehicle status data, generating simulated vehicle dynamics data including predicted vehicle acceleration data (processing block 1030); providing the simulated vehicle dynamics data to an autonomous vehicle simulation system implementing the autonomous vehicle simulation environment (processing block 1040); and using data produced by the autonomous vehicle simulation system to modify the vehicle status data for a subsequent iteration (processing block 1050).

Figure 4:
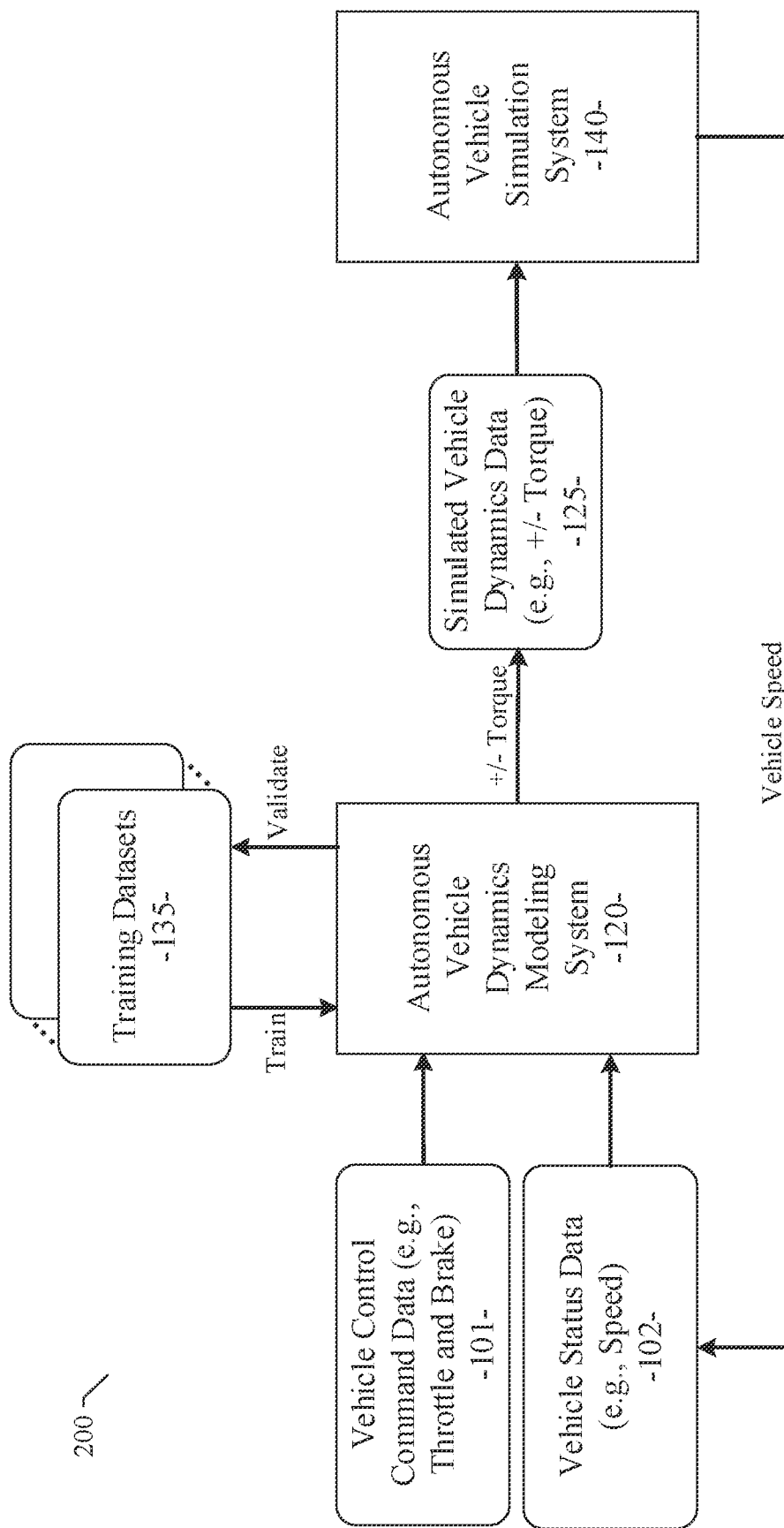
FIG. 4 illustrates a component view of the autonomous vehicle dynamics modeling and simulation system according to an alternative example embodiment.
Figure 5:
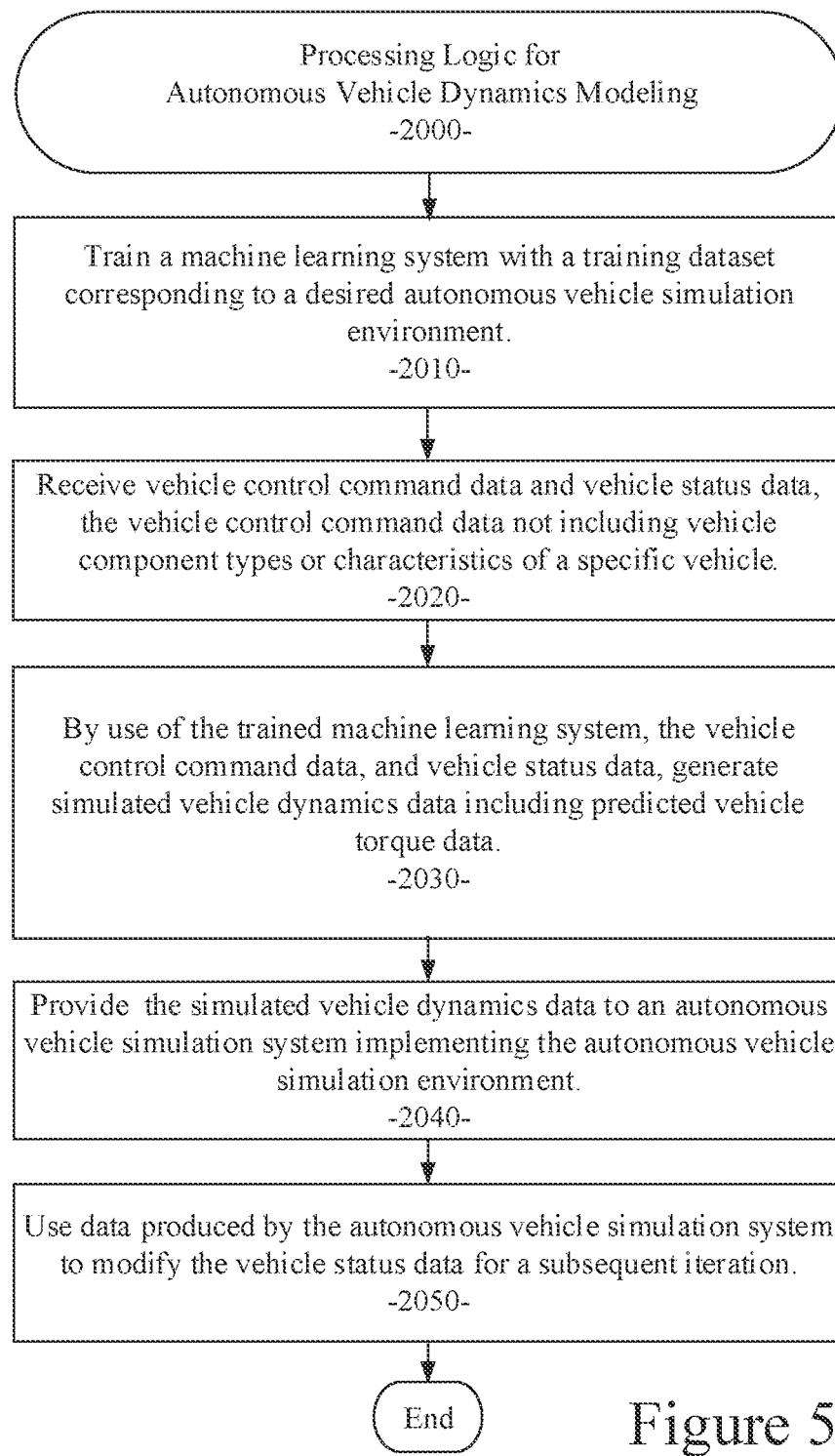
FIG. 5 is a process flow diagram illustrating an alternative example embodiment of a system and method for implementing a neural network based vehicle dynamics model.

In an alternative embodiment shown in FIGS. 4 and 5, the autonomous vehicle dynamics modeling system 120, and the vehicle dynamics modeling module 173 therein, can be configured to produce alternative simulated vehicle dynamics data 125 that corresponds to the modeled vehicle dynamics data produced for the input vehicle control command data 101 and the vehicle status data 102 and based on the neural network 175 trained using one or more of the training datasets 135. In the alternative embodiment as shown in FIG. 4, the simulated vehicle dynamics data 125 can include predicted vehicle torque data for the current iteration, based on the vehicle control command data 101, the vehicle status data 102, and the trained neural network 175. In the alternative embodiment, the vehicle control command data 101 does not need to include steering control data and the vehicle status data 102 does not need to include pitch status information. The predicted vehicle torque data as part of the alternative simulated vehicle dynamics data 125 can be used by the autonomous vehicle simulation system 140 to generate corresponding vehicle speed data, among other values generated for the particular autonomous vehicle simulation environment. The use of predicted torque data instead of predicted acceleration data allows a focus on the actual control mechanisms applied to the vehicle instead of the result of the applied control mechanisms.

Referring now to FIG. 5, a flow diagram illustrates an example embodiment of a system and method 2000 for autonomous vehicle dynamics simulation. The example embodiment can be configured for: training a machine learning system with a training dataset corresponding to a desired autonomous vehicle simulation environment (processing block 2010); receiving vehicle control command data and vehicle status data, the vehicle control command data not including vehicle component types or characteristics of a specific vehicle (processing block 2020); by use of the trained machine learning system, the vehicle control command data, and vehicle status data, generating simulated vehicle dynamics data including predicted vehicle torque data (processing block 2030); providing the simulated vehicle dynamics data to an autonomous vehicle simulation system implementing the autonomous vehicle simulation environment (processing block 2040); and using data produced by the autonomous vehicle simulation system to modify the vehicle status data for a subsequent iteration (processing block 2050).

Figure 6:
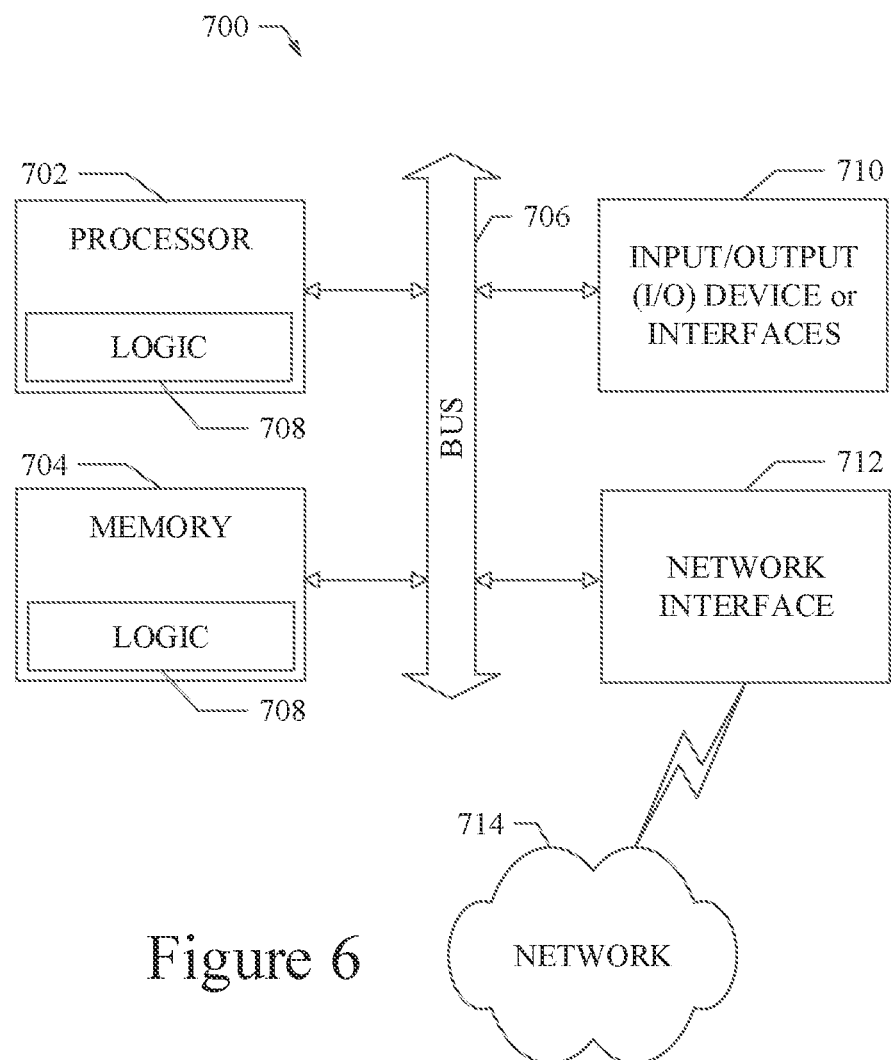
FIG. 6 shows a diagrammatic representation of machine in the example form of a computer system within which a set of instructions when executed may cause the machine to perform any one or more of the methodologies discussed herein.

FIG. 6 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
    a data processor; and
    a memory storing a vehicle dynamics modeling module, executable by the data processor to:
        receive vehicle control command data and vehicle status data;
        generate a first set of simulated vehicle dynamics data based on the vehicle control command data and the vehicle status data by use of a machine learning system trained on a first training dataset comprising recorded historical vehicle driving data captured from real world vehicle operations;
        generate a second set of simulated vehicle dynamics data based on the vehicle control command data and the vehicle status data by use of the machine learning system trained on a second training dataset comprising recorded historical vehicle driving data captured from real world vehicle operations, the second set of simulated vehicle dynamics data being different from the first set of simulated vehicle dynamics data, the first training dataset and the second training dataset each representing a different particular vehicle simulation environment with particular types of vehicles having a defined set of characteristics;
        provide the first and the second set of simulated vehicle dynamics data to an autonomous vehicle simulation system implementing one of the particular vehicle simulation environments;
        modify, by use of the autonomous vehicle simulation system, the vehicle status data by use of either the first or the second set of simulated vehicle dynamics data; and
        generate predicted simulated vehicle acceleration data for simulated autonomous vehicles based on the vehicle control command data and the modified vehicle status data.

2. The system of claim 1 wherein the vehicle control command data comprises throttle, brake, and steering control information corresponding to simulated autonomous vehicles.

3. The system of claim 1 wherein the vehicle status data comprises speed and pitch information corresponding to simulated autonomous vehicles.

4. The system of claim 1 wherein the first training dataset includes training data different from training data of the second training dataset.

5. The system of claim 1 wherein the first training dataset or the second training dataset include training data corresponding to one of the particular vehicle simulation environments.

6. The system of claim 1 wherein the first training dataset or the second training dataset include training data corresponding to the recorded historical vehicle driving data captured from real world vehicle operations or simulated vehicle movements.

7. The system of claim 1 wherein the vehicle dynamics modeling module is further configured to use the simulated vehicle dynamics data to generate validation data to validate the first training dataset or the second training dataset.

8. The system of claim 1 wherein the vehicle dynamics modeling module is further configured to generate validation data to validate an accuracy of the first training dataset or the second training dataset.

9. The system of claim 1 wherein the simulated vehicle dynamics data comprises predicted vehicle dynamics data, wherein the predicted vehicle dynamics data is generated based on the vehicle control command data and the vehicle status data, by use of the machine learning system.

10. The system of claim 1 wherein the simulated vehicle dynamics data comprises predicted vehicle dynamics data, the predicted vehicle dynamics data comprises at least one of predicted acceleration data and predicted torque data, wherein the at least one of the predicted acceleration data and the predicted torque data is generated by use of the trained machine learning system based on the vehicle control command data and the vehicle status data.

11. A method comprising:
    receiving vehicle control command data and vehicle status data;
    generating a first set of simulated vehicle dynamics data based on the vehicle control command data and the vehicle status data by use of a machine learning system trained on a first training dataset comprising recorded historical vehicle driving data captured from real world vehicle operations;
    generating a second set of simulated vehicle dynamics data based on the vehicle control command data and the vehicle status data by use of the machine learning system trained on a second training dataset comprising recorded historical vehicle driving data captured from real world vehicle operations, the second set of simulated vehicle dynamics data being different from the first set of simulated vehicle dynamics data, the first training dataset and the second training dataset each representing a different particular vehicle simulation environment with particular types of vehicles having a defined set of characteristics;

providing the first and the second set of simulated vehicle dynamics data to an autonomous vehicle simulation system implementing one of the particular vehicle simulation environments;

modifying, by use of the autonomous vehicle simulation system, the vehicle status data by use of either the first or the second set of simulated vehicle dynamics data; and generating predicted simulated vehicle acceleration data for simulated autonomous vehicles based on the vehicle control command data and the modified vehicle status data.

12. The method of claim 11 wherein the machine learning system comprises artificial neural networks or connectionist systems.

13. The method of claim 11 wherein the vehicle control command data comprises throttle and brake control information corresponding to simulated autonomous vehicles.

14. The method of claim 11 wherein the vehicle status data comprises speed information corresponding to simulated autonomous vehicles.

15. The method of claim 11 wherein the first training dataset includes training data different from training data of the second training dataset.

16. The method of claim 11 wherein the simulated vehicle dynamics data comprises predicted vehicle torque data generated by use of the trained machine learning system based on the vehicle control command data and the vehicle status data, wherein the vehicle control command data does not comprise steering control data, wherein the vehicle status data does not comprise pitch information.

17. The method of claim 11 wherein the simulated vehicle dynamics data comprises predicted vehicle torque data generated by use of the trained machine learning system based on the vehicle control command data and the vehicle status data, wherein vehicle speed data is generated based on the predicted vehicle torque data.

18. The method of claim 11 including generating validation data to validate an accuracy of the first training dataset or the second training dataset.

19. A non-transitory machine-useable storage medium embodying instructions which, when executed by a machine, cause the machine to:

receive vehicle control command data and vehicle status data;

generate a first set of simulated vehicle dynamics data based on the vehicle control command data and the vehicle status data by use of a machine learning system trained on a first training dataset comprising recorded historical vehicle driving data captured from real world vehicle operations;

generate a second set of simulated vehicle dynamics data based on the vehicle control command data and the vehicle status data by use of the machine learning system trained on a second training dataset comprising recorded historical vehicle driving data captured from real world vehicle operations, the second set of simulated vehicle dynamics data being different from the first set of simulated vehicle dynamics data, the first training dataset and the second training dataset each representing a different particular vehicle simulation environment with particular types of vehicles having a defined set of characteristics;

provide the first and the second set of simulated vehicle dynamics data to an autonomous vehicle simulation system implementing one of the particular vehicle simulation environments;

modify, by use of the autonomous vehicle simulation system, the vehicle status data by use of either the first or the second set of simulated vehicle dynamics data; and generate predicted simulated vehicle acceleration data for simulated autonomous vehicles based on the vehicle control command data and the modified vehicle status data.

20. The non-transitory machine-useable storage medium of claim 19 wherein the first training dataset includes training data different from training data of the second training dataset.

* * * * *